July 27, 1965     R. J. SCHWINGHAMER     3,196,529
APPARATUS FOR SECURING OBJECTS TOGETHER
Filed Sept. 28, 1962     4 Sheets-Sheet 1

ROBERT J. SCHWINGHAMER,
*INVENTOR.*

BY

*ATTORNEY*

July 27, 1965  R. J. SCHWINGHAMER  3,196,529
APPARATUS FOR SECURING OBJECTS TOGETHER
Filed Sept. 28, 1962  4 Sheets-Sheet 2

ROBERT J. SCHWINGHAMER,
INVENTOR.

BY
*G. Q. O'Brien*
ATTORNEY

July 27, 1965 R. J. SCHWINGHAMER 3,196,529
APPARATUS FOR SECURING OBJECTS TOGETHER
Filed Sept. 28, 1962 4 Sheets-Sheet 3

ROBERT J. SCHWINGHAMER,
*INVENTOR.*

BY

*ATTORNEY*

United States Patent Office 3,196,529
Patented July 27, 1965

3,196,529
APPARATUS FOR SECURING OBJECTS
TOGETHER
Robert J. Schwinghamer, 7314 Martha Drive SE.,
Huntsville, Ala.
Filed Sept. 28, 1962, Ser. No. 227,684
24 Claims. (Cl. 29—200)
(Granted under Title 35, U.S. Code (1952), sec. 266)

The invention described herein may be manufactured and used by or for the Government of the United States of America for governmental purposes without the payment of any royalties thereon or therefor.

This invention relates to an apparatus for magnetic forming and magnetic manipulation of solid conductors and more particularly relates to an apparatus for securing various objects together by utilizing an assembly which is deformed by the energy acquired from an oscillatory or pulsed magnetic field.

The development within recent years of relatively large rocket vehicles which are capable of placing various payloads into an orbit around the earth or sending them into deep outer space has served to stimulate an unprecedented amount of interest in the possibility of man himself eventually being able to explore interplanetary space. This interest in the exploration and conquest of space by man has resulted in an enormous amount of time and effort being expended in research devoted to determining the quickest, safest and most economical manner of sending an astronaut on prolonged space voyages. The general consensus among the scientific personnel assigned to the study of the problems that will be encountered in space exploration is that astronauts cannot undertake any deep space voyages or land on other celestial bodies unless they are provided with larger, stronger and heavier space vehicles than can possibly be shot into space by rockets that are now in existence or that will be developed within the near future. Thus, in an effort to overcome this weight and size limitation placed upon the vehicle by the lifting capacity of presently existing rockets, it has been proposed that the various space vehicles suitable for use by astronauts in deep space exploration be constructed in sections here on earth and these sections be rocketed, individually, into orbit. Once all of these separate sections, which will each weigh approximately as much as the individual rocket can lift, are in orbit they can be brought together and assembled into the complete space vehicle necessary for the particular space voyage to be undertaken.

Although this so-called rendezvous technique for assembling together various individual sections of a space vehicle to produce a single vehicle that is far heavier and larger than could be place into orbit at a single launch has successfully overcome certain weight limitation problems that previously existed, it has at the same time given rise to numerous fabrication problems that have heretofore been of little concern. One of these problems, and perhaps the most important and difficult to solve, is what type of fasteners can be used to quickly, yet safely, secure the various sections of the space vehicle together with a minimum amount of effort and expense being involved.

In an effort to find an acceptable fastener for use in fabricating units together in outer space the more or less standard type fastening devices, such as the well known bolt and nut, Huck bolt, rivet and the like, that are now in general use were considered. Although most of these standard fastening devices possess certain characteristics which are very desirable for securing the sections of a space vehicle together they also have a number of disadvanatges which cannot be overcome and which either greatly restrict or completely preclude their use in outer space assembly projects.

In the case of the standard bolt and nut assembly, for example, the fact that the assembly may be tightened to draw or "pull up" the adjacent surfaces of the objects being assembled into very close proximity with one another is highly desirable in a space vehicle since not only must the vehicle be rigidly constructed but in many cases it must be vaccum tight as well. The fact that different sized and shaped nuts can be tightened by a simple tool such as an adjustable wrench is also desirable since this reduces weight, expense and complexity of the assembly procedure.

The reaction forces produced as the nut is rotated upon the bolt to tightly assemble the objects together are highly undesirable, however, and thus preclude the use of a bolt and nut assembly of the standard type. These reaction forces are of very little significance and usually go unnoticed in the normal assembly operations performed under conditions existing here on earth but they become extremely important in relation to objects "floating freely" in outer space since they alter both the attitude and orbit of these floating objects. This tendency for the orbiting objects to be driven from their predetermined orbit by the reaction forces produced as the nut is tightened requires that some source of correction forces such as a corrective propulsion system be provided to maintain the objects in their predetermined position in space. The complexity, weight and expense of such a corrective propulsion source more than offset the simplicity of the tightening tool required for securing the nut and bolt assembly together.

In addition to the reaction force problems encountered when a standard nut and bolt assembly is used, the extremely slow, laborious steps required to properly assemble and tighten the numerous nut and bolt assemblies required to fabricate a space vehicle would place an undue work load upon an astronaut who, at best, will be working under extremely adverse conditions. It is also quite likely that certain sections of the space vehicle will be so located that they will be inaccessible to an astronaut and thus will require the use of some remotely or automatically operated fastener which would obviously preclude the use of a threaded assembly of the standard nut and bolt type.

The so called Huck type bolt is more desirable for space fabrication projects than the standard nut and bolt assembly since it not only can be secured in a faster manner but also produces less reaction forces. This type bolt, however, requires special tightening tools which usually utilize a pneumatic or hydraulic fluid for pulling the bolt during the fastening and securing operation. Besides the insurmountable problems associated with the use of fluids in space, such as vapor pressure, seal joints and the like, the weight of these special tightening tools is excessive. Furthermore, the various hoses required for connecting these tools to the fluid pumping equipment necessary for their operation would greatly restrict the movement of the astronaut as he moves about the space vehicle. Huck bolts are also rather expensive to produce and the fact that a portion of the bolt is normally snapped off during the "pull up" operation thereby producing useless and potentially dangerous objects around the assembly area further adds to their undesirability as fasteners for use in fabricating a space vehicle in outer space.

It is readily apparent that although rivets are inexpensive to produce and have excellent holding features, they cannot be used in space fabrication since their use would not only involve excessive reaction forces but would also require elaborate fluid operated tightening tools. Furthermore, they are not adapted for tightening from a remote position or for installation at an inaccessible point.

According to the present invention it has been found that the above named disadvantages normally associated with standard fasteners and the tools necessary for their use can be overcome by utilizing a novel fastener assembly consisting of a bolt and ring or nut which are clamped together or released from one another by the application of a pulsed magnetic field. The outer periphery of the bolt portion of the fastener assembly is provided with various sawtooth or buttress type surfaces to increase the holding ability of the assembly and, more important, to impart a longitudinal movement or pull up force to the assembly as the ring is radially contracted around the bolt thus giving the assembly both the desirable holding and pull up qualities of the standard bolt and nut arrangement. The ring portion of the assembly is of the type that is readily deformed by an instantaneous magnetic field applied across its longitudinal axis and may also be provided with a hexagon or other equally acceptable periphery configuration for facilitating its removal from the bolt whenever such is desirable.

The magnetic actuating tool utilized for deforming the ring includes any electrical coil which is energized from a suitable electrical power source such as, for example, a capacitor bank. An adjustable time constant circuit is included between the power source and coil for varying the duraiton and amplitude of the electrical pulse applied to the coil.

Accordingly, the primary object of this invention is to provide a device for securing objects together which utilizes a deformable fastener assembly that is actuated by the energy acquired from a magnetic field.

Another object of this invention is to provide a magnetically actuated fastener assembly that is highly reliable, easy to use, inexpensive to manufacture and produces no undesirable reaction forces when it is operated.

Yet another object of this invention is to produce an actuating tool for tightening or releasing a magnetically actuated fastener assembly.

These and further objects and advantages of this invention will become more apparent upon reference to the following description, claims and appended drawings wherein:

Figure 1:
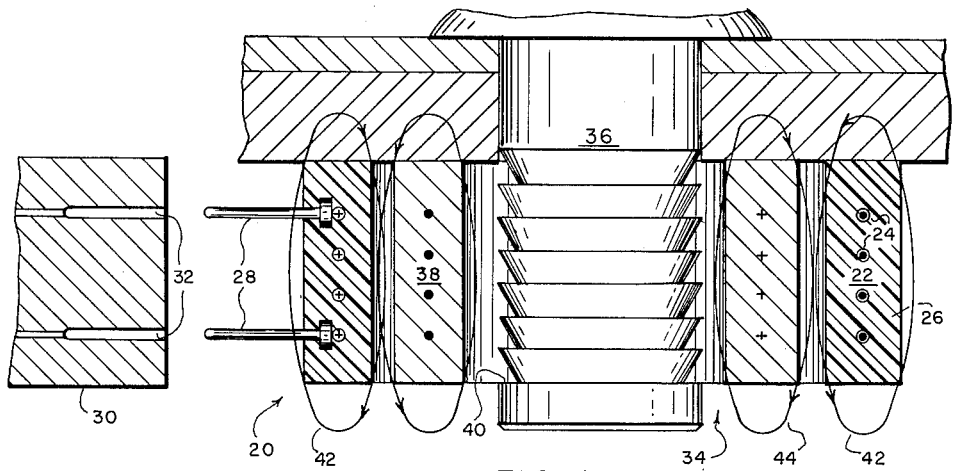
FIGURE 1 is an enlarged longitudinal section taken through a magnetically actuated fastener assembly and actuating tool pictorially illustrating the electromotive forces existing between the interfaces of the assembly and tool.

With continued reference to the accompanying drawings wherein like reference numerals designate similar parts throughout the various views, and with initial attention directed to the embodiment of the invention as shown in FIGURE 1, reference numeral 20 is used to generally designate an actuating tool constructed in accordance with one concept of the present invention. This actuating tool consists in its simplest form of an electromagnetic coil 22 which is fabricated from a special electrical conductor 24 such as beryllium copper, or hard bronze. Each convolution of the coil 20 is electrically insulated from the others and is held in operating position by a suitable potting material 26 such as produced by Product Research Corporation under the designation "PRC-1538 with metal primer PR-1531." This potting material 26 is not only an excellent insulator for preventing arcing between the convolutions of the coil 20 but it also has an extremely high tensile strength, thus greatly enhancing the overall operation of the coil in a manner that will be more fully explained hereinbelow.

For purposes of connecting the electromagnetic coil 20 to a suitable energizing circuit, a pair of electrical terminals or coupling means 28 are partially embedded in the potting material and are connected to the respective ends of the conductor 24. The electrical terminals 28 may also serve as means for mounting the coil 22 on a suitable handle or holding means 30 by simple providing mating terminal means 32 on the handle into which terminals 28 are inserted. The method by which a coil 22 is mounted upon a handle 30 by utilizing such terminal means 32 is more clearly shown in FIGURE 12 although it is readily apparent from this figure that the handle could be formed as an integral part of the coil form if such were desirable. The use of a detachable handle, however, permits a plurality of a detachable handle which carries a mating terminal means permits different sizes or types of electromagnetic coils to be employed without requiring a separate holding means and associate circuit for each. This interchangeability of coils is especially advantageous where weight and ease of use is at a premium such as is the case in outer space applications. Under certain conditions thumb screws or other like means may be used to clamp the terminals 28 and 32 together tightly to prevent excessive arcing.

The actuating tool 20 is depicted as being positioned about a magnetically actuated fastener assembly, generally designated as 34, consisting of a bolt or shaft 36 around which is placed a metal, magnetically deformable retainer ring or "nut" 38. The bolt or shaft 36 is provided with a plurality of sawtooth or buttress type ramp surfaces 40 for reasons that will be more fully explained in reference to FIGURES 3 through 5.

The general overall principle upon which the actuating tool 20 and magnetically actuated fastener assembly 34 operates can be explained in substantially the following manner. With the actuating tool 20 positioned around the deformable fastener ring 38, as shown in FIGURE 1, a controlled ultra fast discharge of current through the coil 22 will produce a strong flux field 42 which, because of the close coupling existing between the coil and ring, induces currents in the ring that are in opposition to the initiating or primary current applied to the coil. These induced currents in the metal ring 38 in turn create a flux field 44 which greatly increases the magnetic flux in the area between the coil 22 and a point in the skin of the ring 38 (the point being determined by the field penetration depth).

Since the flux fields 42 and 44 create an area of magnetic pressure in this space, a repelling force will exist between the flux fields and thus between the coil 22 and ring 38 which will tend to drive these objects apart. From this it is readily seen that if the coil 22 is designed so as to prevent motion of the conductor 24 and the flux fields are sufficiently strong, then motion of the ring 38 must result for substantially the same reason that an electric motor rotates when energized. In fact, the basic descriptive equation which describes the forces involved in the instant actuating tool and ring is Ampere's law, or the $F=BLI \sin \theta$ relationship employed in determining the force exerted on a current carrying conductor in a magnetic field where:

$B$=flux density in webers per square meter
$L$=conductor length in meters
$I$=the current in the conductor in amperes, and
$\theta$=the angle between the flux and the conductor.

To estimate the amount of energy that can be transferred from a coil to a deformable metal workpiece, the exact current-voltage relationships existing in the coil and workpiece must be known. This current-voltage relationship can be expressed by the following simultaneous equations.

The voltage relationships existing in the primary circuit or coil 22 are:

$$e = i_c r_c + L_c \frac{di_c}{dt} + M \frac{di_m}{dt}$$

where:

$e$=applied voltage
$i_c$=coil current
$i_m$=induced current in the ring 38
$r_c$=coil resistance
$L_c$=coil inductance
$M$=mutual inductance In the metal deformable ring 38 the voltage relationships are:

$$0 = i_m r_m + L_m \frac{di_m}{dt} + M \frac{di_c}{dt}$$

where:

$r_m$=metal resistance
$L_m$=metal inductance
$i_m$=induced current in the nut 38
$i_c$=current in the metal
$M$=mutual inductance Also, for the case where the medium surrounding the two coupled circuits (coil 22 and ring 38) has constant permeability then:

$$\frac{V_c}{V_m} = \frac{L_c}{M}$$

where:

$V_m$=induced voltage in the nut 38
$L_c$=coil inductance
$V_c$=coil voltage or $$V_m = \frac{V_c M}{L_c}$$

$M$=mutual inductance

This states that the voltage of self induction induced in nut 38 by a certain changing current in coil 22 varies directly with coil voltage $V_c$ and mutual inducance M, and inversely with coil inductance.

From the foregoing it is readily apparent that the amount of energy which can be transferred to a metal ring 38 depends on the voltage applied to the coil 22, the duration and shape of the current pulse in the coil, and the magnetic coupling existing between the elements. Furthermore, the electrical energy input into the magnetic field of a conductor varies directly with the inductance of the coil 22 and the current squared if the permeability involved is constant, or, expressed another way:

$$W = \frac{Li^2}{2}$$

where:

$L$=inductance
$i$=current

Of considerable importance also is the resistance of the material forming the ring 38 since resistance determines the eddy current flow that will take place. Numerous materials having low resistvity such as, for example, aluminum or copper have been successfully used to form the ring 38 with excellent results. On the other hand, the magnetic properties of the material from which the ring 38 is formed is relatively unimporant because of the extremely intense magnetic fields generated in the coil 22. That is, at relatively high levels of magnetic field strength the magnetic properties of the ring material used are relatively unimportant. This is readily seen when it is realized that magnetic fields can easily be produced in the coil 22 which are high enough to produce the phenomena of "magnetic sawing" of the material being magnetically formed. This magnetic sawing results when the applied magnetic fields are of such intensity as to actually melt the metal ring 38 locally, which melted material is then repelled by the field, so that grooves are produced in the structure of the metal nut. Such intense fields are normally both unnecessary and undesirable, however, since the ring 38 can be properly formed using a much lower field intensity, thus saving electrical power and giving a better finished fastener assembly.

As can be inferred from the foregoing equations, the timing of the electrical discharge through the coil 22 is extremely important. In most practical cases where the ring 38 is to be swaged about the bolt 36, the discharge current pulse rise time or "ringing frequency," in the case of damped oscillatory mode operation, should be rapid enough so that no appreciable magnetic flux can completely penetrate the metal nut being worked. This field penetration depth or "skin effect" produced by a current pulse can be described as the diminishing of current density from the surface to the interior of a conductor carrying an alternating current. Therefore, high frequency transmission line theory regarding skin effect facilitates the determination of this critical parameter and is applied as follows:

If an alternating field is imposed on a conductive material such as the metal ring 38, the current distribution in the region at and below the surface of an infinite conductor plane is:

$$J_x = J_0 e^{-\alpha x_e} e^{i \alpha x}$$

where $J_x$ is the current density at any point $x$ units of distance below the surface, $\alpha$ is the reciprocal of the current penetration depth, and $J_0$ is current density at the surface. When the exponent $\alpha x_e$ becomes unity, the current has fallen to $1/e$, or 37 percent of surface current density which is the familiar penetration depth relationship employed in high frequency transmission line theory. Thus, the depth of penetration can be defined as $$t = 5.03 \left( \frac{\rho}{\mu f} \right)^{1/2} \text{cm.}$$

where $\rho$ is resistivity, $\mu$ is permeability and $f$ is frequency. From this relationship it can be seen that if the ring 38 is formed of a material having high-resistivity such as stainless steel, it will be much more difficult to manipulate and will pose special problems.

Figure 2:
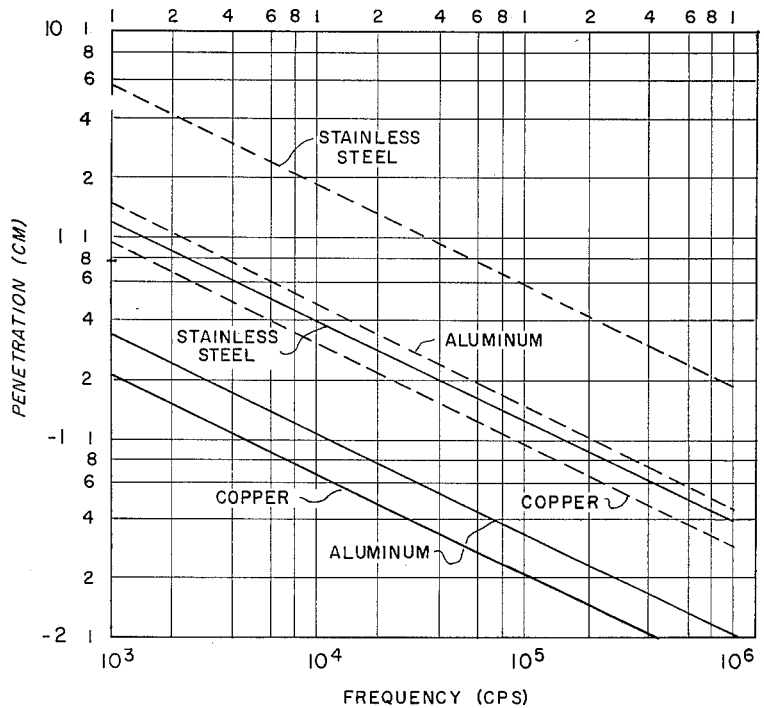
FIGURE 2 is a graph showing the current penetration vs. frequency for various metals used in constructing the present fastener assembly.

The field penetration depth of various particular metals from which the bolt 36 and/or ring 38 can be made is shown by the chart of FIGURE 2. This penetration depth chart gives penetration depths in centimeters vs. frequency for two levels. The depth of penetration to the point where current density is 37% of surface density is depicted by the lower solid lines for a given material in each case while the upper dotted line corresponds to the 1 percent level.

The energy densities associated with the intense magnetic fields produced by a timed electrical discharge through the coil 22 are comparable to those achievable with various types of chemical explosives. This energy density is given as;

$$\frac{B^2}{2\mu} \text{ newtons/m.}^2$$

where $B=$flux density in webers per sq. meter and $\mu=$ magnetic permeability in MKS units. Consequently, a megagauss field has an energy density of $40 \times 10^9$ ergs or 1000 calories per cubic centimeter and develops a magnetic pressure of 580,000 pounds per square inch at the boundaries of the magnetic field.

Figure 3:
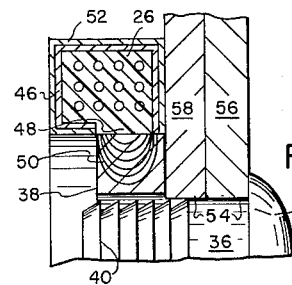

Obviously, the tremendous forces produced when the coil 22 is properly energized by a timed pulse tends to rupture or destroy the coil by repelling it away from the ring 38. In order to retain the coil disrupture forces and to concentrate the flux paths of the magnetic fields through the ring 38 to be magnetically formed, the coil 22 is normally encased in one or more metal jackets or other suitable rigid covering material. As shown in FIGURE 3, a first metal jacket 46 formed from a sheet of material having fairly high conductivity is wrapped around the potted coil 22. An opening 48 is normally left between the edges of the sheet so that the flux fields escaping from the coil, as pictorially illustrated by the lines 50, will be concentrated through the ring 38. A second high strength metal jacket 52 is formed around the coil 22 in substantially the same manner as the jacket 46 for further increasing the strength of the coil. Since the second jacket 52 need not possess a high conductivity factor it can be formed of steel or other like materials having an extremely high tensile strength as opposed to the relatively low strength of the conductive material from which the jacket 46 is formed.

By using a bolt or shaft 36 having a plurality of sawtoothed or buttress type ramp surfaces it is possible to pull up or tighten the objects being secured together in much the same manner as if a conventional nut and bolt assembly were being employed. This pull up or tightening of the objects being secured together can be more clearly understood by referring to FIGURE 3 in which the bolt 36 is shown inserted through apertures 54 in a first and second plate 56–58 respectively. The head 60 of the bolt 36 is pressed against the plate 56 so that the ramped surfaces 40 of the bolt extends through the plates. The magnetically deformable ring or nut 38 is now slipped over that portion of the surface 40 extending beyond the plate 58. Since the ring 38 is not threaded upon nor in any way engages the bolt 36 at this time, no close tolerences need be maintained in producing the bolt and ring as would be the case in a normal threaded bolt and nut assembly. With a wide variance in tolerance thus being permissable a reduction in the initial cost of producing the unit is realized. The fact that the ring is slipped over the bolt rather than threaded thereon also permits a faster and easier assembly which is extremely important in the case of space assembly projects.

Once the bolt 36 is correctly positioned through the plates 56–58 and the ring 38 is in place as shown in FIGURE 3, the actuating tool 20 is placed around the ring 38 and energized by a suitably time current pulse. As the magnetic flux field 50 builds up in the coil 22 and is applied to the ring 38, the ring will be repelled away from the coil in a manner explained herinabove. As the ring 38 is driven away from the coil 22, as indicated by the arrow 62 in FIGURE 4, the inner periphery 64 of the ring will engage against the sawtoothed edges and will be forced to "slide" or move along the tapered surface 66 of the ramp surface 40. Since the sawtoothed edges of the surface 40 cut into the inner periphery 64 of the ring 38 and slides along the tapered surface 66, a substantial pressure will be produced between the plate 58 and the bolt 36 which will tend to move the plate and bolt in opposite directions as indicated by the arrows 68 and 70, respectively. The movement of the bolt 36 is in turn transmitted through the head 60 of the bolt to the plate 56 resulting in this plate being pulled in the direction of the arrow 72.

Figure 5:
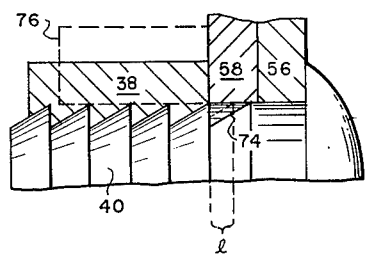

With the plate 56 being forcefully moved in the direction of the arrow 72 and the plate 58 moving in the opposite direction as indicated by the arrow 68, the mating interfaces of the plates will be pressed together and held under a relatively high pressure. As can be seen in FIGURE 5, which shows the ring 38 completely pressed into the ramp surface 40, the bolt has been pulled forward a distance $l$ from its initial position (FIG. 3) as represented by the broken line 74. The broken line 76 represents the initial shape of the magnetically deformable ring 38 before the coil 22 was energized. Thus radial contraction, and axial expansion, of ring 38 creates a high axial fastening force.

Figure 4:
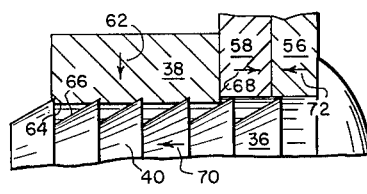
FIGURES 3 through 5 are partial axial sections illustrating the pull up and clamping action produced when the ring of the fastener assembly is swaged.
Figure 6:
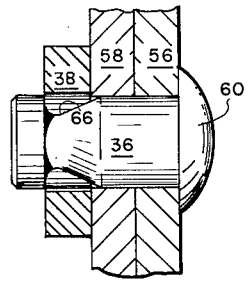
FIGURES 6 and 7 are longitudinal sections taken through a second and third embodiment, respectively, of the bolt assembly utilized in the present invention with portions shown in side elevation.

As will be obvious from viewing FIGURES 3 through 5, a greater pull up force can be produced between the plates 56–58 by simply lengthening the tapered surface 66 of the ramp 40 as shown in FIGURE 6. This bolt configuration is especially adapted to form air tight joints since by properly designing the depth and length of the single ramp surface 40 any desired amount of pull up pressure up to that actually required to shear the bolt 36 may be exerted upon the plates 56–58.

Figure 7:
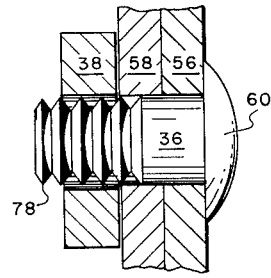

For those occasions when little or no pull up is desired between the plates 56 and 58 but a high degree of holding force is required, as might be the case when the plates are made of plastic or other readily destructable material, the bolt 36 can be provided with annular grooves or threads 78 such as shown in FIGURE 7. These threads 78 are equally tapered on both surfaces so that the forces produced when the ring 38 is swaged or deformed about the bolt 36 will effectively cancel out thereby producing no longitudinal movement providing the ring is properly positioned with respect to plate 56 before swaging. Normally the threads 78 will have no pitch since it is not intended that the ring 38 be removed from the bolt by a standard wrench or like tool.

Figure 8:
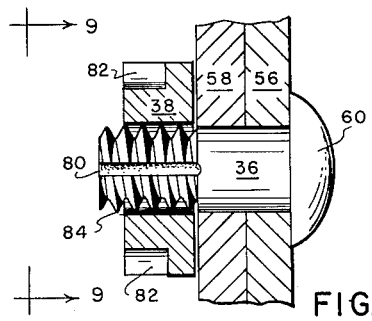
FIGURE 8 is a longitudinal section taken through a fourth embodiment of the bolt assembly with portions shown in side elevation.
Figure 9:
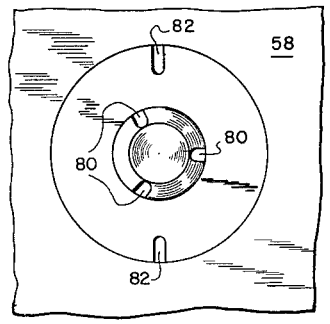
FIGURE 9 is an end view of the fastener assembly shown in FIGURE 8.

Under certain conditions it may be desirable, however, to design the fastener assembly 34 so that the ring and bolt can be mechanically separated thereby releasing the plates 56 and 58 from one another. To form such a separable fastener assembly the bolt 36, as shown in FIGURES 8 and 9, is threaded much as a standard bolt and the magnetically deformable ring 38 is provided with suitable means such as recessed slots 82 for receiving a tool to be used in unthreading the ring once it is lightly swaged about bolt 36. A plurality of "locking" grooves 80 are cut longitudinally along the peripheral surface of the thread portion of the bolt 36 so that as the ring 38 is swaged about the bolt a portion of the ring will be forced into the grooves thereby locking the ring against rotational movement. Needless to say, no longitudinal movement can occur between the bolt 36 and ring 38 since the inner periphery of the ring is swaged upon the pitched threads of the bolt.

To mechanically remove the ring 38 once it is swaged about the bolt 36, an appropriate size drill is inserted into the grooves 80 for removing that portion of the ring pressed into the grooves. With the ring 38 and grooves 80 now effectively disengaged a suitable tool or wrench is inserted into the slots 82 and the ring rotated off the bolt 36 in the same manner as a standard nut and bolt assembly is separated. In the case where the swaged ring 38 is not to be used again as a standard nut it can be removed from the bolt 36 by simply using a chisel or wedge like tool sufficiently large to split the ring as the tool is driven along the grooves 80.

Figures 10A, 10B:
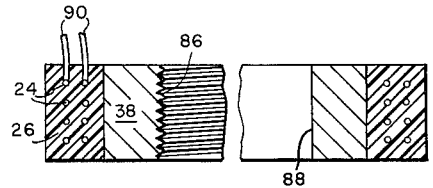
FIGURES 10A and 10B are longitudinal sections, each section being taken through a retainer ring and actuating tool constructed as a single retainer ring assembly for remote operation.

As mentioned hereinabove, there will undoubtedly be certain instances in the fabrication of a space vehicle in outer space which will require the use of some remotely operated fastener assembly. Since such remotely operated fastener assemblies will generally be of the so called "one-shot" type and therefore not intended for reuse they should ideally be inexpensive to produce yet highly reliable and easy to use. FIGURES 10A and 10B show two embodiments of such a remotely operated deformable ring which is extremely inexpensive to produce and yet possesses the desirable characteristics of being highly reliable and simple to operate.

In reference to FIGURES 10A and 10B it can be seen that the remotely operated deformable ring 38 has the potted coil 22 molded or otherwise securely mounted around its outer periphery thus forming a single unitary construction. The design of the coil 22 and the potting material 26 is such that even though the coil may be destroyed when it is energized sufficient energy will be imparted to the ring 38 to properly swage it about a suitable bolt or like object. The inner periphery of the ring 38 is shown provided with either a threaded surface 86 (FIGURE 10A), or a smooth surface 88 (FIGURE 10B), depending on whether the ring is to be slipped or threaded onto the bolt to be employed. Flexible insulated electrical leads 90 are shown extending from the coil 24 through the potting material 26 for connecting the coil 22 to a suitable source of current.

Figure 11A:
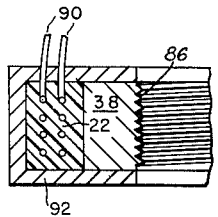
FIGURES 11A and 11B are longitudinal sections, each section being taken through a retainer ring and actuating tool constructed as a single assembly for remote operation.
Figure 11B:
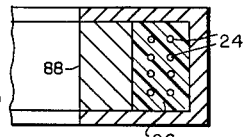

FIGURES 11A and 11B illustrate how a U-shaped jacket 92 can be added to a simple potted coil and ring assembly whenever a greater swaging force than can be produced by the assemblies of FIGURES 10A and 10B is required. Any suitable material that possesses the necessary strength and conductivity to direct most of the swaging forces produced by the coil 22 upon the outer periphery of the ring 38 can be used. Metals having a high conductivity and high tensile strength are especially well suited for use in forming such jackets since they not only possess the required tensile strength but also act to concentrate the magnetic flux fields across the open end of the U-shaped jacket and through the deformable ring 38.

It is apparent from the design of the fastener ring assembly shown in FIGURES 10A–10B and 11A–11B that parts, vehicles or the like can be rigidly attached together from a remote location merely by attaching the assembly to a suitable power source, and then remotely energizing the assembly through a simple trigger device by means of a radio signal. For example, one space application of the ring construction of the types shown in FIGURES 10A–10B or 11A–11B involves joining together two space vehicles such as a command module and a tanker or service module. One of the space vehicles will be provided with the ring assemblies of FIGURES 10A–10B or 11A–11B while the other will be provided with a mating probe somewhat like the bolt or shaft 36 described hereinabove. The exact position of the two objects to be joined will be accurately monitored by radio and when the proper orientation has been accomplished a signal will be given to cause the coil 22 to be energized and the ring 38 swaged upon the probe thereby consummating the mating of the two vehicles.

Although the actuating tool 20 has been shown constructed in the form of a well known solenoid coil it will be obvious that numerous other coil forms can be used as long as a suitable magnetic field of sufficient density to deform the ring 38 being worked is produced.

Figure 12:
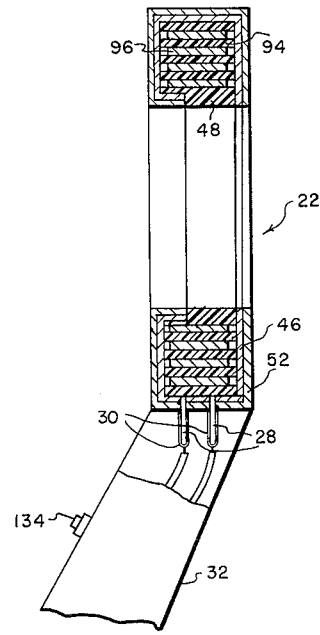
FIGURE 12 is a longitudinal section taken through a second embodiment of an actuating tool for operating the fastener assembly.

FIGURE 12 shows one such modification in which the coil 22 of the actuating tool is formed of a flat metal ribbon 94 wound on its side and separated by an insulative ribbon 96. The advantage of using a flat metal ribbon as opposed to a wire conductor is that a more even force gradient exists over a larger area of the coil thereby applying a more even force pattern to the ring 38 to be deformed. It is also possible to wind the flat metal ribbon 94 on its edge whenever such is desired.

Figure 13:
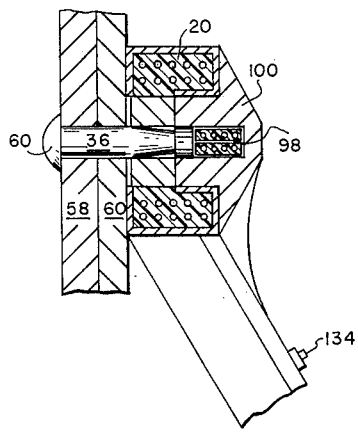
FIGURE 13 is a longitudinal section taken through a third embodiment of an actuating tool for operating the fastener assembly.

FIGURE 13 shows yet another type of actuating tool 20 that can be used to swage the ring 38. This tool is provided with a second electromagnetic coil 98 which is positioned directly above the bolt 36 by a suitable cup or arm arrangement 100. By properly controlling the sequence in which the coils 20 and 98 are energized so that coil 20 is energized just prior to coil 20 the bolt 36, which is formed from a reasonably conductive ferri-magnetic material, will be subjected to a greater pull up force than could otherwise be possible. This additional pull up is produced by the ultra fast collapse of the magnetic field from coil 98 acting on the bolt 36 and is especially useful in obtaining a tight fit between the plates 58 and 60 since it assures the fact that the bolt head 60 will always be pulled tightly against the plate 58 before the ring 38 is swaged. Obviously a permanent magnet could be substituted for the electromagnetic coil 98 under certain conditions where only a holding or positioning force is necessary and no substantial additional pull up force is required.

In certain instances it may be desirable to fasten or clamp one object around another without deforming the outer object in the manner that the ring 38 is deformed around the bolt 36 as seen in FIGURE 5. Such an instance is clearly illustrated in FIGURE 14 wherein an antifriction ball bearing unit 102 is shown mounted to a plate 104 by a bolt 106 formed of split sections 107. This bearing unit 102 consists of inner and outer race surfaces 108 and 110, respectively, between which is mounted a plurality of ball bearings 112. Obviously any swaging or other deformation of the bearing unit 102 in a manner similar to that which occurs when the fastener ring 38 is clamped about the bolt 36 in FIGURE 5 would completely destroy the usefulness of the unit. No deformation of the bearing unit 102 is necessary or will occur in the present case, however, since the split bolt 106 is expanded outwardly to grip and securely hold the bearing unit 102 in substantially the following manner.

Figure 15:
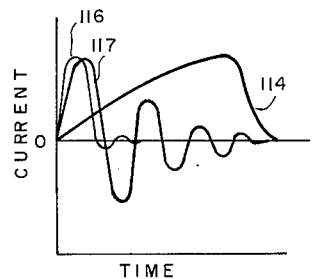
FIGURE 15 is a graph illustrating the duration and amplitude of typical current pulses applied to the actuating tool of FIGURE 14.

Rather than applying a rapid or sudden current pulse to the coil 20 as was done in the case of FIGURE 1 where the ring 38 was to be swaged inwardly a slower rising current pulse is applied to the coil 20 thereby permitting the bolt 106 to become "saturated" by the magnetic flux field produced by the coil. Once the bolt 106 is saturated the pulse is abruptly cut off thereby causing the flux fields produced by the coil 20 to suddenly collapse which in turn forcefully pulls the sections 107 of the bolt 106 into engagement with the inner race 108 of the bearing unit 102. FIGURE 15 pictorially compares the duration and shape of a slow rising current pulse 114 as used in the instant case with a current pulse 116 or oscillation 117 such as is applied in the case of FIGURE 1.

To insure that a minimum of force is applied to the bearing unit 102 when the magnetic flux field produced by the coil 20 is collapsed, the bearing unit is constructed of a material which has a low conductivity factor such as certain of the plastics or stainless steel. A sleeve 118 formed of a relatively soft metal or like material may also be force fitted against the inner race 108 so that the teeth of the split bolt 106 can better grip the bearing unit 102 whenever such is necessary.

Figure 14:
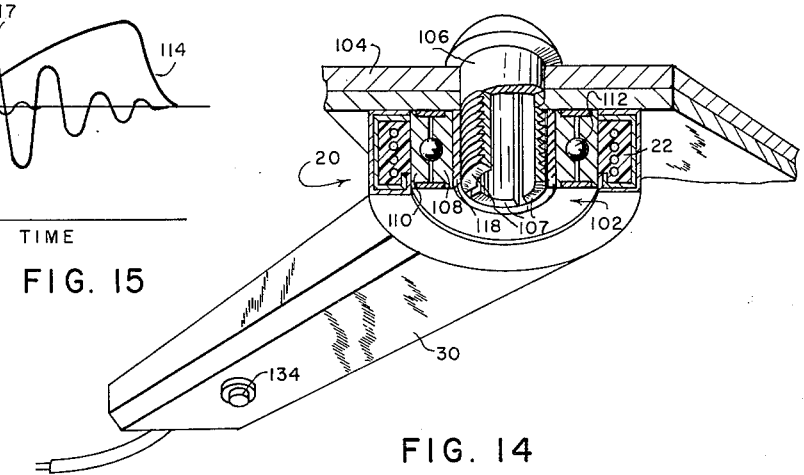
FIGURE 14 is a perspective view, partially in section, of a magnetically actuated fastener assembly and actuating tool constructed in accordance with another embodiment of the present invention.

Obviously somewhat the same principle as used to expand the slit bolt 107 into engagement with bearing unit 102 of FIGURE 14 can be used to expand the fastener ring 38 away from the bolt 36 of FIGURE 5. In this case where the ring 38 is to be removed a relatively long current pulse is applied to the coil 20 surrounding the swaged fastener ring thereby saturating the ring and bolt 36. Once this current is abruptly cut off, the ring 38 and bolt 36 will both be subjected to a force produced by the collapsing flux fields which will tend to expand them in a radially outward direction. The bolt 36 since it is not formed of split sections as is the bolt 106 of FIGURE 14 will have sufficient strength to prevent any radial expansion but ring 38, which has less tensile strength and higher conductivity and is subjected to a somewhat higher expansion force, will be drawn radially outward some predetermined increment, or until it engages with the coil 20. This movement in a radially outward direction of the fastener ring 38 will in turn release the ring from the tapered surface 40 of the bolt 36 thereby permitting the ring to be slipped off the bolt and the plates 56–58 separated.

Figure 16:
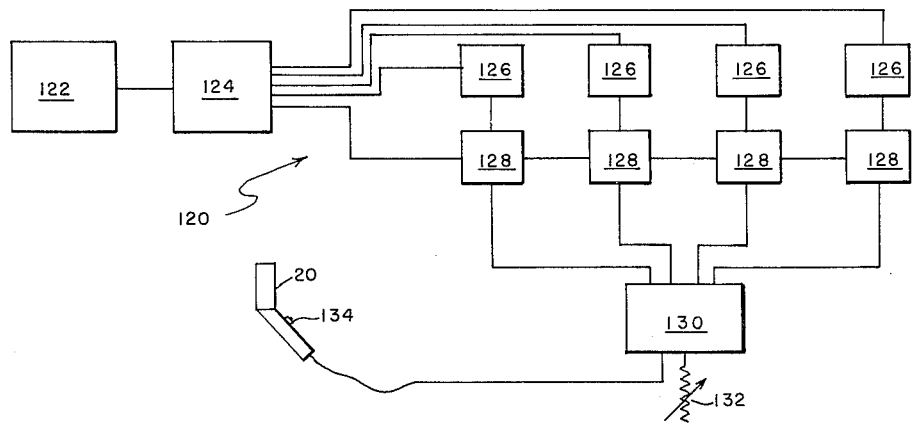
FIGURE 16 is a schematic block diagram illustrating the electrical power system used for energizing the actuating tool.

FIGURE 16 shows a block diagram of one type of power supply system designated as 120 which is particularly well adapted for energizing the actuating tool 20 in outer space fabrication projects. The basic source of power for the power supply system 120 is derived from the main power supply, or from a thermionic solar cell bank 122 or the like which generally is mounted on the outer surface of the space vehicle in a well known manner. The small current supplied by the bank 122 is applied through a multiplexer circuit 124 to a plurality of suitable storage elements 126 such as terrestrial capacitors.

The multiplexer circuit 124 is of the solid state type and is capable of switching the small charge current produced by the cell bank 122 from one storage element 126 to another as each becomes charged. In this manner as each storage element 126 is fully charged the multiplexer 124 will sense this fully charged condition and will connect the next element to the cell bank 122 for charging. This switching procedure will continue until all the elements are fully charged and ready to energize the actuating tool.

The output from each charging element 126 is connected through a suitable switching means 128, such as a thryatron, ignition, or vacuum switch, to a current collector 130 which acts to combine these separate inputs into a single output when high outputs are required. However, the single charging elements 126 may also be discharged one at a time whenever such is desirable. A suitable means 132 is incorporated into the design of the current collector 130 for varying both the duration and amplitude of the pulse applied to the actuating tool 20 thereby permitting the optimum current pulse, which is readily determined in the manner discussed hereinabove, to be applied to the actuating tool and fastener assembly regardless of the particular type of elements that may be used. A switch 134 or like control means is included on the handle 32 of the actuating tool for permitting the operator of the tool to remote control or adjust the storage system 120.

As will be apparent from the foregoing description, the actuating tool and fastener assembly of the present invention are unique and the very essence of simplicity in that they are extremely inexpensive, small and highly portable with no moving parts. In the case of the present actuating tool, no pneumatic or hydraulic fluids and their associated pumping systems such as have heretofore been necessary for the proper operation of prior known actuating tools is used thereby completely eliminating the problems associated therewith. Furthermore, since no moving parts are required there is no lubrication involved nor any parts to be replaced because of wear. Very little heat need be dissipated which is also a factor of great importance in space environmnt. The fact that the coil section can be readily removed and another coil inserted on the handle portion of the actuating tool is important since this permits different sizes and types of coils to be used without requiring a separate handle and controls for each. A second coil or permanent magnet may also be incorporated into the actuating tool when an additional pull up or holding force is required.

The use of the special type fastener assemblies which utilizes a magnetically deformable ring or nut that can be vigorously repelled by a very fast discharge of current through the actuating tool permits the simultaneous pulling up and fastening of two objects in a manner heretofore unknown. This pull up and fastening is accomplished without any unbalanced torque or movements being produced. Hence it is ideal for use under zero "G" conditions where such forces would necessitate the use of a corrective system to maintain a predetermined orbital path. The fact that the ring and bolt assembly can be readily separated by mechanical means or by simply applying a relatively long pulse through the coil thus attracting the ring away from the bolt is also extremely important. By using a split bolt and a relatively long pulse through the actuating tool it is also possible to expand the bolt rather than swage the ring whenever such is desirable.

A remotely operated fastener assembly can be readily produced in a manner disclosed hereinabove by combining an actuating coil and deformable ring to form a single unit. Such remotely operated units are especially well adapted for use in inaccessible or dangerous areas where a fastening operation is required.

The power supply system utilized to furnish the current necessary to energize the actuating tool is also unique in that by using storage elements a low current source can be effectively increased to a very high level. This ability to use effectively a low current source for operating an actuating tool is a substantial improvement over the high average continuous current sources normally required by a conventional electrically operated actuating tool.

From the above it is readily apparent that by utilizing the teachings of this invention a vastly superior actuating tool and fastener assembly can be produced which gives a higher pull up and holding force without any torque or reaction force being produced than has heretofore been obtainable. It is also apparent that the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by the United States Letters Patent is:

1. Apparatus for securing objects together comprising:
   (A) fastener means having a head means and a free end portion,
       (1) said head means being adapted to engage one surface of said objects to be secured together while said free end portion extends through and projects beyond the other surface of said objects,
   (B) deformable clamp means having an inner diameter greater than the diameter of said free end portion of said fastener means,
       (1) said clamp means being positioned around said free end portion of said fastener means and against the other surface of said objects to be secured together, and
   (C) magnetomotive force producing means positioned adjacent said clamp means for applying a constricting force of such strength and duration to said clamp means as to cause it to be swaged about said free end portion of said fastener means thereby securing said objects together.

2. Apparatus for securing objects together comprising:
   (A) fastener means having a head means and a free end portion,
       (1) said head means being adapted to engage one surface of said objects to be secured together while said free end portion extends through and projects beyond the other surface of said objects, (B) ring means having an inner diameter greater than the diameter of said fastener means,
   (1) said ring means being slipped over said free end portion of said fastener means and against the other surface of said objects to be secured together, (C) magnetomotive force producing means positioned around said ring means, and (D) energizing means connected to said magnetomotive force producing means for applying a current pulse thereto of such strength and duration as to transfer the necessary energy to said ring means to cause it to be swaged about said free end portion of said fastener means thereby securing said objects together.

3. Apparatus according to claim 2 wherein said free end portion of said fastener means includes a ramp surface with said ring means being positioned over said ramp surface so that, said ring means is driven along said ramp surface when said ring means is swaged thereby applying longitudinal pressure to said fastener means.

4. Apparatus for securing objects together comprising:
(A) fastener means,
   (1) said fastener means including a shank which extends through said objects to be joined together,
   (2) recessed holding means formed in said shank,
(B) ring means having an inner diameter greater than the diameter of said shank,
   (1) said ring means being slipped over said recessed holding means,
(C) magnetomotive force producing means positioned around said ring means, and
(D) energizing means connected to said magnetomotive producing means for applying a current pulse to said magnetomotive producing means of such strength and duration as to transfer the necessary energy to said ring means to cause it to be swaged about said recessed holding means thereby securing said objects together.

5. Apparatus according to claim 4 wherein said shank is provided with longitudinal groove means for preventing rotational movement of said ring means when said ring means is swaged about said recessed holding means.

6. Apparatus according to claim 4 wherein said recessed holding means is a grooved surface.

7. Apparatus according to claim 6 wherein said recessed holding means is a threaded surface having a pitch applied thereto.

8. An assembling and securing apparatus adapted for use with a shank type fastener means having a free end portion around which said apparatus is positioned comprising:
(A) magnetomotive force producing means adapted to be positioned around a magnetically deformable ring means, and
(B) lead means extending from said magnetomotive force producing means for connecting a current pulse to said magnetomotive force producing means of such strength and duration as to transfer the necessary energy to said ring means to cause it to be swaged inwardly to contact and secure said ring means against said shank.

9. An assembling and securing apparatus according to claim 8 wherein said magnetomotive force producing means is a solenoid.

10. An assembling and securing apparatus according to claim 9 wherein said deformable ring means and said solenoid are substantially encased by a force containing jacket means which acts to direct substantially all of the energy produced by said solenoid onto said ring means.

11. An assembling and securing apparatus according to claim 10 wherein said jacket is formed of metal, said metal jacket acting to concentrate the magnetic fields produced by said solenoid through said deformable ring.

12. A magnetomotive force producing device adapted for use with a magnetically actuated fastener assembly comprising:
(A) an insulated electrical conductor wound in the shape of a flat spiral coil,
   (1) jacket means substantially completely surrounding said coil for concentrating the magnetomotive force produced by said coil within a given zone,
(B) handle means connected to said coil for supporting said coil, and
(C) means for applying a current pulse to said coil of a predetermined amplitude and duration for producing a magnetomotive force of sufficient strength to magnetically form metal.

13. A magnetomotive force producing device according to claim 12 wherein said jacket means is metal.

14. A magnetomotive force producing device according to claim 12 wherein said coil is detachable from said handle.

15. A magnetomotive force producing device according to claim 12 wherein a magnetic means is mounted on said coil for exerting a pull up force on the object being secured by said magnetomotive force producing means.

16. A magnetomotive force producing device according to claim 12 wherein said means for applying a current pulse to said coil includes means for varying the amplitude and duration of the current pulse so that the field penetration of the magnetomotive force can be confined to a preselected area.

17. A magnetomotive force producing device according to claim 16 wherein a capacitor bank is provided for storing current to be applied to said coil.

18. In combination:
(A) an apparatus for assembling and securing together at least a first and second object,
   (1) fastener means including a head and a shank,
      (a) said shank being extended through and positioned so that a free portion thereof projected above said objects,
      (b) said head of said fastener means being pressed against said first objects,
   (2) ring means having an inner diameter greater than the diameter of said free portion of said shank,
      (a) said ring means being slipped over said free portion of said shank and against said second object,
(B) magnetomotive force producing means positioned in a cooperating manner around said ring means, and
(C) energizing means connected to said magnetomotive force producing means for applying a current pulse to said magnetomotive producing means of such strength and duration as to transfer the necessary energy to said ring means to cause it to be swaged around said shank means.

19. The combination according to claim 18 wherein said magnetomotive force producing means is a solenoid.

20. The combination according to claim 19 wherein said solenoid and said ring means are formed as a single unitary structure.

21. The combination according to claim 20 wherein said solenoid is substantially surrounded with jacket means for concentrating the energy produced by said solenoid upon said ring means.

22. Apparatus for securing objects together comprising:
(A) fastener means having a free end portion,
(B) deformable retainer means having an opening therein at least as large as said free end portion and arranged in surrounding relation thereto, and (C) magnetomotive force producing means positioned around said retainer means and actuatable to produce and apply an intense constricting force to said retainer means to swage it about said fastener means.

23. A magnetomotive force producing device for use with a magnetically actuated fastener assembly comprising:

(A) an insulated electrical conductor wound in the shape of a coil with an axial opening to receive a fastener retainer, (B) jacket means surrounding all of said coils except for a discontinuity around the inner periphery thereof for concentrating the magnetomotive force produced by said coil in a zone in said opening, and (C) means for applying a current pulse to said coil of a predetermined amplitude and duration and with sufficient rapidity to produce a magnetomotive constricting force of sufficient magnitude to deform metal.

24. In combination:

(A) an apparatus for assembling and securing together plurality of objects having aligned openings therein, (B) fastener means including, (1) a shank passing through said opening in said objects, and (2) a head in engagement with the external surface of one of said objects, (C) deformable ring means having an opening therein to receive the free end of said shank and engaged thereover adjacent to another one of said surfaces, (D) magnetomotive force producing means surrounding said ring means, and (E) energizing means electrically connected to said force producing means for applying a current pulse thereto with sufficient strength, duration and rapidly to produce a magnetomotive constricting force of sufficient magnitude to rapidly deform the ring means into gripping engagement with the free end of said shank.

References Cited by the Examiner

UNITED STATES PATENTS

| | | | |
|---|---|---|---|
| 2,480,804 | 8/49 | Yeager | 29—208 |
| 2,976,907 | 3/61 | Harvey | 29—421 |
| 3,054,170 | 9/62 | Benichasa | 29—208 |
| 3,088,200 | 5/63 | Birdsall et al. | 29—421 |

WHITMORE A. WILTZ, *Primary Examiner.*

THOMAS H. EAGER, *Examiner.*